(12) United States Patent
Andrasko et al.

(10) Patent No.: US 9,598,160 B2
(45) Date of Patent: Mar. 21, 2017

(54) SYSTEMS AND METHODS FOR AUTOMATICALLY CONTROLLING ATTITUDE OF A MARINE VESSEL WITH TRIM DEVICES

(71) Applicant: Brunswick Corporation, Lake Forest, IL (US)

(72) Inventors: Steven J. Andrasko, Oshkosh, WI (US); Andrew J. Przybyl, Berlin, WI (US); Steven M. Anschuetz, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 14/874,740

(22) Filed: Oct. 5, 2015

(65) Prior Publication Data

US 2016/0375972 A1     Dec. 29, 2016

Related U.S. Application Data

(60) Provisional application No. 62/183,392, filed on Jun. 23, 2015.

(51) Int. Cl.
*B63H 20/10* (2006.01)
*B63J 99/00* (2009.01)
*G05D 3/00* (2006.01)

(52) U.S. Cl.
CPC .............. *B63H 20/10* (2013.01); *B63J 99/00* (2013.01); *G05D 3/00* (2013.01); *B63J 2099/006* (2013.01)

(58) Field of Classification Search
CPC ........... B60L 3/00; B63H 20/00; B63H 20/10; B63H 20/14; B63H 20/20; B63H 21/21;
(Continued)

(56) References Cited

U.S. PATENT DOCUMENTS 3,777,694 A    12/1973  Best
4,318,699 A     3/1982  Wenstadt et al.
(Continued)

OTHER PUBLICATIONS

Andrasko et al., "Systems and Methods for Providing Notification Regarding Trim Angle of a Marine Propulsion Device", Unpublished U.S. Appl. No. 14/573,200, filed Dec. 17, 2014.
(Continued)

*Primary Examiner* — Lars A Olson
(74) *Attorney, Agent, or Firm* — Andrus Intellectual Property Law, LLP

(57) ABSTRACT

A system and method control a trim device that positions a trimmable marine apparatus with respect to a marine vessel. A trim system is operated in an automatic mode, in which a controller sends signals to actuate the trim device automatically as a function of vessel or engine speed, or a manual mode, in which the controller sends signals to actuate the trim device in response to commands from an operator input device. An operating speed of the propulsion system is determined. When the operating speed has crossed a given operating speed threshold, the trim system is subsequently operated in the automatic or manual mode depending on whether the operating speed increased or decreased as it crossed the operating speed threshold and whether the trim system was operating in the automatic or manual mode as the operating speed crossed the operating speed threshold.

20 Claims, 6 Drawing Sheets

(58) Field of Classification Search
CPC ...... B63H 21/22; B63H 21/26; B63H 11/107;
G05D 1/0875; G06F 7/00; B63B 1/20;
B63B 1/22; B63B 1/24; B63B 1/32;
B63B 39/00; B63B 39/06
USPC .................. 114/285, 286; 440/1; 701/21
See application file for complete search history.

(56) References Cited

U.S. PATENT DOCUMENTS

| | | | |
|---|---|---|---|
| 4,565,528 A | 1/1986 | Nakase | |
| 4,718,872 A | 1/1988 | Olson et al. | |
| 4,749,926 A | 6/1988 | Ontolchik | |
| 4,776,818 A | 10/1988 | Cahoon et al. | |
| 4,824,407 A | 4/1989 | Torigai et al. | |
| 4,861,292 A | 8/1989 | Griffiths et al. | |
| 4,872,857 A | 10/1989 | Newman et al. | |
| 4,898,563 A | 2/1990 | Torigai et al. | |
| 4,908,766 A | 3/1990 | Takeuchi | |
| 4,931,025 A | 6/1990 | Torigai et al. | |
| 4,939,660 A | 7/1990 | Newman et al. | |
| 5,113,780 A | 5/1992 | Bennett et al. | |
| 5,171,172 A | 12/1992 | Heaton et al. | |
| 5,263,432 A | 11/1993 | Davis | |
| 5,352,137 A | 10/1994 | Iwai et al. | |
| 5,366,393 A | 11/1994 | Uenage et al. | |
| 5,385,110 A | 1/1995 | Bennett et al. | |
| 5,474,012 A | 12/1995 | Yamada et al. | |
| 5,474,013 A | 12/1995 | Wittmaier | |
| 5,507,672 A | 4/1996 | Imaeda | |
| 5,540,174 A | 7/1996 | Kishi et al. | |
| 5,683,275 A | 11/1997 | Nanami | |
| 5,707,263 A | 1/1998 | Eick et al. | |
| 5,832,860 A | 11/1998 | Lexau | |
| 5,879,209 A | 3/1999 | Jones | |
| 6,007,391 A | 12/1999 | Eilert | |
| 6,095,077 A | 8/2000 | DeAgro | |
| 6,167,830 B1 | 1/2001 | Pilger | |
| 6,273,771 B1 | 8/2001 | Buckley et al. | |
| 6,354,237 B1 | 3/2002 | Gaynor et al. | |
| 6,458,003 B1 | 10/2002 | Krueger | |
| 6,745,715 B1 | 6/2004 | Shen et al. | |
| 6,997,763 B2 | 2/2006 | Kaji | |
| 7,156,709 B1 | 1/2007 | Staerzl et al. | |
| 7,188,581 B1 | 3/2007 | Davis et al. | |
| 7,311,058 B1 | 12/2007 | Brooks et al. | |
| 7,389,165 B2 | 6/2008 | Kaji | |
| 7,416,456 B1 | 8/2008 | Gonring et al. | |
| 7,543,544 B2 | 6/2009 | Yap | |
| 7,617,026 B2 | 11/2009 | Gee et al. | |
| 7,641,525 B2 | 1/2010 | Morvillo | |
| 8,145,370 B2 | 3/2012 | Borrett | |
| 8,216,007 B2 | 7/2012 | Moore | |
| 8,261,682 B1 | 9/2012 | DeVito | |
| 8,376,791 B2 | 2/2013 | Chiecchi | |
| 8,376,793 B2 | 2/2013 | Chiecchi | |
| 8,388,390 B2 | 3/2013 | Kuriyagawa et al. | |
| 8,428,799 B2 | 4/2013 | Cansiani et al. | |
| 8,457,820 B1 | 6/2013 | Gonring | |
| 8,480,445 B2 | 7/2013 | Morvillo | |
| 8,583,300 B2 | 11/2013 | Oehlgrien et al. | |
| 8,622,777 B1 | 1/2014 | McNalley et al. | |
| 8,631,753 B2 | 1/2014 | Morvillo | |
| 8,858,278 B2 | 10/2014 | Morvillo | |
| 2011/0263167 A1 | 10/2011 | Chiecchi | |
| 2013/0312651 A1 | 11/2013 | Gai | |
| 2013/0340667 A1 | 12/2013 | Morvillo | |
| 2014/0209007 A1 | 7/2014 | Morvillo | |
| 2014/0224166 A1 | 8/2014 | Morvillo | |

OTHER PUBLICATIONS

Andrasko et al., "System and Method for Controlling Attitude of a Marine Vessel Having Trim Tabs", Unpublished U.S. Appl. No. 14/472,565, filed Aug. 29, 2014.

Andrasko et al., "Systems and Methods for Controlling Movement of Drive Units on a Marine Vessel", Unpublished U.S. Appl. No. 14/177,762, filed Feb. 11, 2014.

Mercury Marine, 90-8M0081623 JPO Owners Manual—Auto Trim Portion, Section 2—On the Water, May 2013, p. 21.

Mercury Marine, 90-8M0076286 JPO Service Manual—Auto Trim Portion, Theory of Operation, Jul. 2013, p. 2A-5A.

Poirier, Brian, "System and Method for Positioning a Drive Unit on a Marine Vessel," Unpublished U.S. Appl. No. 14/177,767, filed Feb. 11, 2014.

International Search Report and Written Opinion issued in corresponding International Application No. PCT/US2016/032150, mailed Aug. 10, 2016.

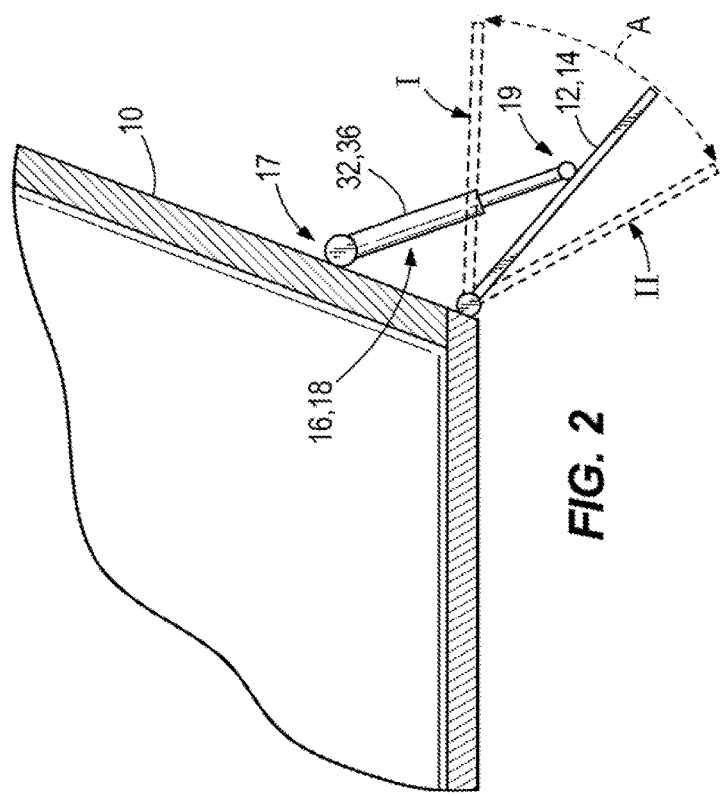
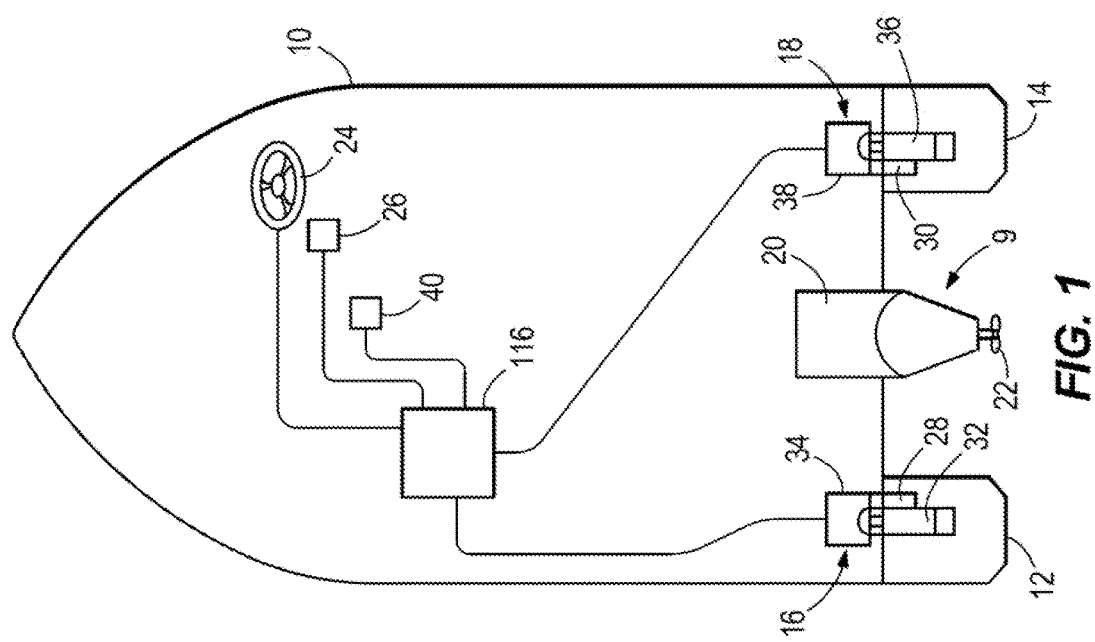

SYSTEMS AND METHODS FOR AUTOMATICALLY CONTROLLING ATTITUDE OF A MARINE VESSEL WITH TRIM DEVICES

CROSS-REFERENCE TO RELATED APPLICATION

The present application claims the benefit of U.S. Provisional Application Ser. No. 62/183,392, filed Jun. 23, 2015, which is hereby incorporated by reference herein.

FIELD

The present disclosure relates to systems and methods for controlling an attitude of a marine vessel.

BACKGROUND

Each of the below U.S. Patents and Applications is hereby incorporated herein by reference.

U.S. Pat. No. 4,776,818 discloses an electrical control system for trimming a pair of stern motors or drives mounted side-by-side on a boat. The two drives are both jointly and independently movable through a plurality of trim positions. The system includes two trim cylinders, each coupled to one associated drive, to move its associated drive to different trim positions both jointly as well as independently of each other. An operator controlled mechanism energizes and de-energizes the two trim cylinders simultaneously to jointly vary the trim position of the two drives. Two lines, each coupled at its first end to one associated drive, independently detect both the angular trim position of its associated drive with respect to the other drive as well as detects the trim position of the two drives jointly. Detection apparatus is coupled to the second end of each of the two lines and is responsive to the two lines when the two drives are not in the desired equal trim position with respect to each other for controlling switches to inactivate one of the trim cylinders and thereby moves the other of the trim cylinders with respect to the inactivated one trim cylinder until the desired equal trim position is achieved between the two drives.

U.S. Pat. No. 4,861,292 discloses a system for optimizing the speed of a boat at a particular throttle setting that utilizes sensed speed changes to vary the boat drive unit position vertically and to vary the drive unit trim position. The measurement of boat speed before and after an incremental change in vertical position or trim is used in conjunction with a selected minimum speed change increment to effect subsequent alternate control strategies. Depending on the relative difference in before and after speeds, the system will automatically continue incremental movement of the drive unit in the same direction, hold the drive unit in its present position, or move the drive unit an incremental amount in the opposite direction to its previous position. The alternate control strategies minimize the effects of initial incremental movement in the wrong direction, eliminate excessive position hunting by the system, and minimize drive wait repositioning which has little or no practical effect on speed.

U.S. Pat. No. 5,263,432 discloses adjustment of a power boat's trim tabs that is automated throughout all phases of the operation of the boat. The boat's speed and/or the revolutions of its engine(s) are sensed and used by electronic circuits, including microprocessor-based circuits, to control prime movers, typically hydraulic pumps, in order to move the trim tabs to their optimal position. In one embodiment the boat's speed is sensed by a speedometer. Below a first predetermined speed, the boat's trim tabs are moved full down. Above a second, higher, predetermined speed the trim tabs are moved full up. In another embodiment the trim tabs are further adjusted in and about their up position, and while the boat is on-plane, so as to optimize the performance of the boat. The boat's on-plane performance is monitored by a speedometer or, preferably, by one or more tachometers. After the boat has exceeded the first predetermined speed, after the trim tabs have been initially adjusted to their full up positions, and after the speedometer or tachometer(s) is (are) continuously reading values within some small, preset, range, the trim tabs are perturbed slightly in position. The boat's throttle remains unchanged. After a settling time any effect of the changed trim tab position on the boat's performance is assessed. The trim tabs are moved in position until performance is no longer improved by further perturbations in position.

U.S. Pat. No. 5,707,263 discloses a system for a trimmable marine stern drive that shifts the trimmable range on a conventional hydraulic trim system. The system includes an enlarged cylinder anchor pin hole in the drive shaft housing, an anchor pin smaller in size than the enlarged anchor pin hole located in the drive shaft housing, and a movable trim adjustment insert that is inserted into the enlarged anchor pin hole to secure the anchor pin in a fixed position within the enlarged hole. It is preferred that the enlarged anchor pin hole be a substantially horizontal elongated hole, and that the trim adjustment insert be placed rearward of the anchor pin to position the anchor pin in a forward position, or forward of the anchor pin to locate the anchor pin in a rearward position. The invention shifts the trimmable range of the drive, while maintaining vibration isolation characteristics available in conventional hydraulic trim systems.

U.S. Pat. No. 6,007,391 discloses an automatically adjustable trim system for a marine propulsion system that provides automatic trimming of the propeller in response to increased loads on the propeller. A propulsion unit is attached to a boat transom through a tilt mechanism including a transom bracket and a swivel bracket. In a first embodiment, the transom bracket is clamped to a flexible transom which flexes in response to forces exerted on the transom during acceleration. In a second embodiment, the transom bracket is clamped to a transom bracket mounting platform that is generally parallel to and pivotally attached to the transom. A trim angle biasing mechanism is mounted between the transom and the transom bracket mounting platform for automatically adjusting the trim angle. A third embodiment includes a trim angle biasing mechanism incorporated into the transom bracket or swivel bracket. A fourth embodiment includes a spring-loaded pawl assembly between the swivel bracket and transom bracket.

U.S. Pat. No. 7,188,581 discloses a marine drive and a marine vessel and drive combination having a trim tab with a forward end pivotally mounted to a marine propulsion device.

U.S. Pat. No. 7,416,456 discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 8,457,820 discloses a method for controlling the operation of a marine vessel, subject to porpoising. The method includes sensing an operational characteristic of the marine vessel which is indicative of porpoising of the marine vessel, and responding, to the sensing of the operational characteristic with a response that is representative of the operational characteristic of the marine vessel as being indicative of the porpoising of the marine vessel.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One example of the present disclosure includes a method for controlling a trim device that positions a trimmable marine apparatus with respect to a marine vessel having a propulsion system powered by an engine. The method includes operating a trim system in one of an automatic mode, in which a controller sends signals to actuate the trim device automatically as a function of one of a speed of the vessel and a speed of the engine, and a manual mode, in which the controller sends signals to actuate the trim device in response to commands from an operator input device. The method also includes determining an operating speed of the propulsion system. In response to a determination by the controller that the operating speed has crossed a given operating speed threshold, the method includes subsequently operating the trim system in one of the automatic and manual modes depending on whether the operating speed increased or decreased as it crossed the operating speed threshold and whether the trim system was operating in the automatic or manual mode as the operating speed crossed the operating speed threshold.

Another example of the present disclosure includes a trim system for positioning a trimmable marine apparatus with respect to a marine vessel having a propulsion system powered by an engine. The trim system includes a trim device having a first end coupled to the vessel and a second, opposite end coupled to the trimmable marine apparatus. The trim device is moveable to adjust a position of the trimmable marine apparatus with respect to the vessel. A controller selectively controls the trim system in an automatic mode, in which the controller sends signals to actuate the trim device automatically as a function of one of a speed of the vessel and a speed of the engine. An operator input device selectively controls the trim system in a manual mode, in which the controller sends signals to actuate the trim device in response to commands from the operator input device. An operating speed sensor senses a speed of the propulsion system. In response to a determination by the controller that the operating speed has crossed a given operating speed threshold, the controller subsequently operates the trim system in one of the automatic and manual modes depending on whether the operating speed increased or decreased as it crossed the operating speed threshold and whether the trim system was operating in the automatic or manual mode as the operating speed crossed the operating speed threshold.

BRIEF DESCRIPTION OF THE DRAWINGS

The present disclosure is described with reference to the following Figures. The same numbers are used throughout the Figures to reference like features and like components.

FIG. 1 illustrates one example of a marine vessel having trim tabs coupled by trim devices to its transom.

FIG. 2 illustrates details of the trim tabs and trim devices of FIG. 1.

DETAILED DESCRIPTION

Figure 3:
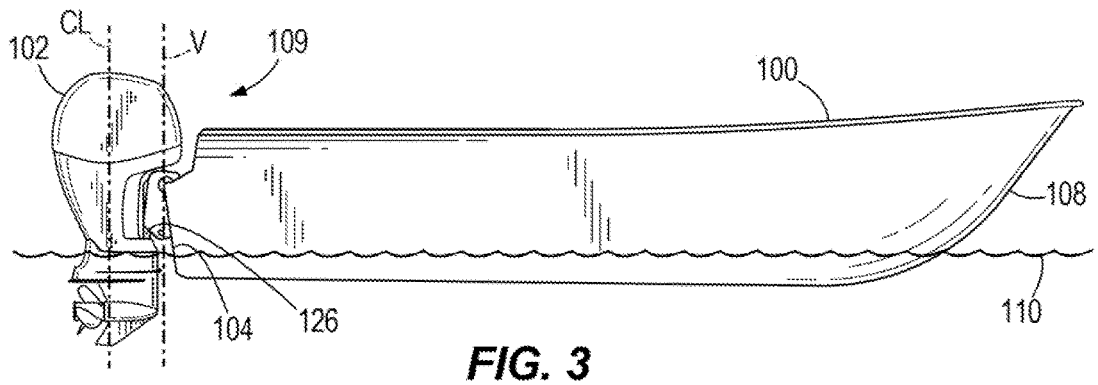
FIGS. 3-5 illustrate a second example of a marine vessel having an outboard motor coupled by trim devices to its transom.

In the present description, certain terms have been used for brevity, clarity and understanding. No unnecessary limitations are to be inferred therefrom beyond the requirement of the prior art because such terms are used for descriptive purposes only and are intended to be broadly construed.

The present disclosure relates to systems and methods for controlling actuation of one or more trim devices on a marine vessel so as to control a relative position of a trimmable marine apparatus with respect to the marine vessel. For example, as used herein, the term "trim devices" refers to any device used to rotate another marine device or apparatus up or down with respect to a transom of a marine vessel. In one example, the trim device is a hydraulic trim cylinder, although the principles of some of the below examples could apply equally to electric, pneumatic, or other types of trim devices. The trim device may be actuated between an extended position and a retracted position by provision of hydraulic fluid, electrical power, pneumatic fluid, etc. The extension and retraction of such trim devices can be used to rotate other marine apparatuses, such as components of the vessel's propulsion system or other devices located at the vessel's stern, up and down with respect to the transom of a marine vessel to which they are coupled. Examples of such other marine apparatuses include, but are not limited to: trim tabs, trim deflectors or interceptors, and/or trimmable marine propulsion devices such as outboard motors or lower units of stern drives.

Those skilled in the art of marine vessel propulsion and control are familiar with many different ways in which the trim angle of a trimmable marine apparatus can be used to change the operating characteristics of the vessel. For example, many manual trim control systems are known to those skilled in the art. In typical operation, the operator of a marine vessel can change the trim angle of the associated marine apparatuses as the velocity of the vessel changes. This is done to maintain an appropriate angle of the vessel with respect to the water as it achieves a planing speed and as it increases its velocity over the water while on plane. The operator inputs a command to change the trim angle for example by using a keypad, button, or similar input device with "trim up" and "trim down" input choices. The operator can select these input choices to trim the marine devices up or down until a desired handling or feel of the vessel over the water is achieved.

The systems of the present disclosure are also capable of carrying out automatic trim (auto-trim) methods, in which the trim devices are automatically extended or retracted with respect to their current positions in order to rotate the trimmable marine apparatuses and thereby achieve a desired attitude of the marine vessel with respect to vessel speed or engine speed. Auto-trim systems perform the trim operation automatically, as a direct function of vessel speed or engine speed, without requiring intervention by the operator of the marine vessel. The automatic change in trim angle of the trim devices enhances the operation of the marine vessel as it achieves planing speed and as it further increases its velocity over the water while on plane. The trim devices can also be positioned to affect vessel roll and pitch, but the focus of the application described herein below is on an auto-trim system that determines optimal trim angles based on at least vessel speed and/or engine speed. For example, see U.S. Pat. Nos. 4,861,292 and 7,416,456, incorporated by reference herein above.

FIG. 1 illustrates one example of a marine vessel 10 having a system for controlling an attitude of the marine vessel 10. The marine vessel 10 has at least two trimmable marine apparatuses, here, first and second trim tabs 12, 14 connected to the transom of the marine vessel 10. The trim tab 12 is actuated by a trim device 16 and the trim tab 14 is actuated by a trim device 18. Marine vessel 10 includes a propulsion system 9 including a drive unit 20, which may be, for example, a pod drive, inboard drive, stern drive, or outboard motor. The drive unit 20 has an engine (not shown) that turns a propeller 22 to produce a thrust to propel the marine vessel 10 in a generally forward direction. The drive unit 20 is capable of rotating around a generally vertical axis in response to commands from a steering wheel 24 or autopilot section 26. The drive unit 20 may also be trimmable, as will be discussed further herein below. Also included on the marine vessel 10 are trim tab sensors 28, 30, for sensing a position of the trim tabs 12, 14. For example, the trim tab sensors 28, 30 may be Hall Effect sensors.

As mentioned, the marine vessel 10 is provided with first and second trim devices 16, 18. The first trim device 16 may comprise a hydraulic cylinder 32 connected to an electro-hydraulic actuator 34, including a motor and pump. The hydraulic cylinder 32 operates to rotate the first trim tab 12 to a trimmed-out or zero degree position, to a trimmed-in position, or to maintain the trim tab 12 in any desired position between these two. Similarly, the second trim device 18 may comprise a hydraulic cylinder 36 connected to an electro-hydraulic actuator 38. The hydraulic cylinder 36 operates to rotate the second trim tab 14 to the trimmed-out or zero degree position, to the trimmed-in position, or to maintain the trim tab 14 in any desired position. Other types of hydro-mechanical or electromechanical actuators could be used in other examples.

Those having ordinary skill in the art will appreciate that the trim tabs 12, 14 are designed to pivot and can be actuated to different deployments with respect to the transom of the marine vessel 10. With reference to FIG. 2, generally, each trim device 16, 18 has a first end 17 coupled to the vessel 10 and a second, opposite end 19 coupled to the trimmable marine apparatus, in this case the trim tab 12 or 14. The trim devices 16, 18 are moveable to adjust a position of the trim tab 12 or 14 with respect to the vessel 10. For example, the trim tabs can be deployed from 0% deployment where they project generally horizontally (position I), to 100% deployment (position II), where they lie at a calibrated maximum angle A with respect to horizontal. The calibrated maximum angle A at which the trim tabs 12, 14 are considered 100% deployed can vary based on the specifics of the marine vessel to which the trim tabs are attached. In accordance with the nomenclature provided herein, the trim tabs 12, 14 are less deployed when they lie closer to horizontal, and are more deployed when they extend at increasingly greater angles to horizontal. To put the bow of the marine vessel 10 down, both trim tabs 12, 14 are moved down to the maximum lowered position, or "trimmed-in" position, which may be used while attempting to get on-plane. For low power or trailing operation, the trim tabs are lifted to the maximum raised position, or "trimmed-out" position. The trim tabs 12, 14 can also be deployed to angles that are different front one another in order to create or counteract pitch or roll movements of the marine vessel 10. These different trim angles are achieved by different positions of the hydraulic cylinders 32, 36.

Figure 4:
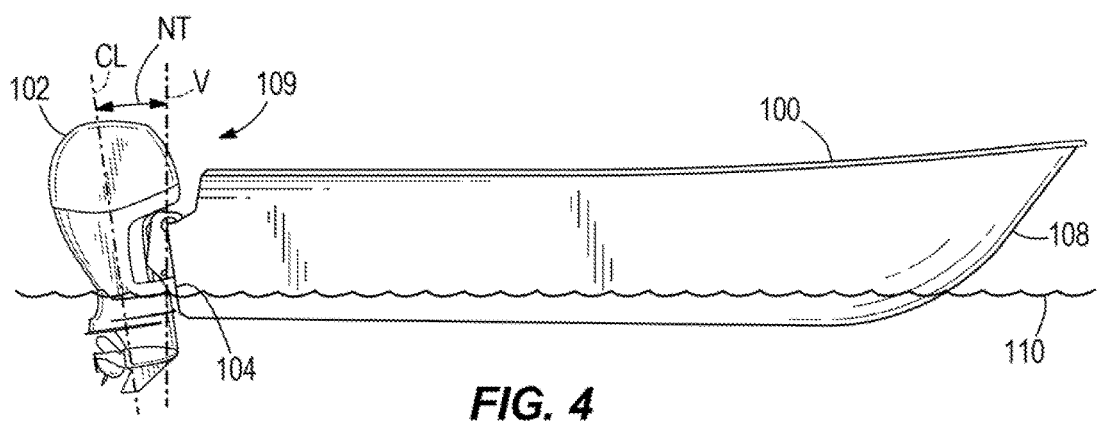
Figure 5:
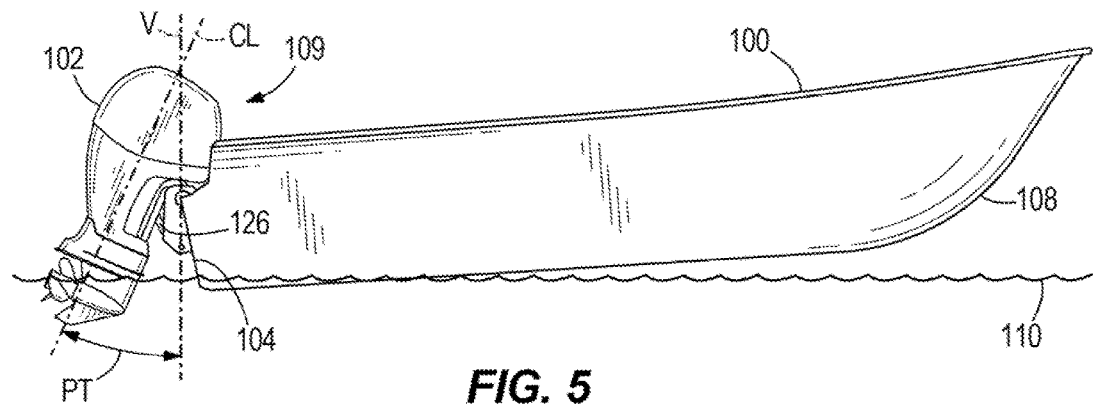

FIGS. 3-5 illustrate another example of a marine vessel 100 having a system for controlling an attitude of the marine vessel 100. In this example, the marine vessel 100 is equipped with a propulsion system 109 including one or more drive units 102, such as the outboard motor shown, on its transom 104. The drive unit 102 itself comprises a trimmable marine apparatus that can be trimmed to different angles with respect to the transom 104 via trim devices 126 such as hydraulic cylinders having one end coupled to the transom of the vessel 100 and the other end coupled to the outboard motor as known to those having ordinary skill in the art. In FIG. 3, the drive unit 102 is shown in a neutral (level) trim position, in which the drive unit 102 is in more or less of a vertical position. This can be seen by comparing centerline CL of the drive unit 102 with vertical line V, where the two lines are parallel. In FIG. 4, the drive unit 102. Is shown in a trimmed in (trimmed down) position. In other words, the lines CL and V will intersect below where the drive unit 102 is connected to the transom 104. This may be referred to as a negative trim angle (NT) according to an exemplary convention. In FIG. 5, the drive unit 102 is shown in a trimmed out (trimmed up) position. The lines CL and V will intersect above the drive unit's connection point to the transom 104. This may be referred to as a positive trim angle (PT). The positions in FIGS. 3 and 4 are generally used when the marine vessel 100 is operating at slower speeds. For example, the trim position shown in FIG. 3 is often used when the marine vessel 100 is in a joysticking mode or is docking. The trim position in FIG. 4 is often used during launch of the marine vessel 100, before the marine vessel 100 has gotten up to speed and on plane. In contrast, the trim position shown in FIG. 5 is often used when the marine vessel 100 is on plane and high speeds are required. At high speeds, the trim position shown in FIG. 5 causes the bow 108 of the marine vessel 100 to rise out of the water 110 as shown.

Figure 6:
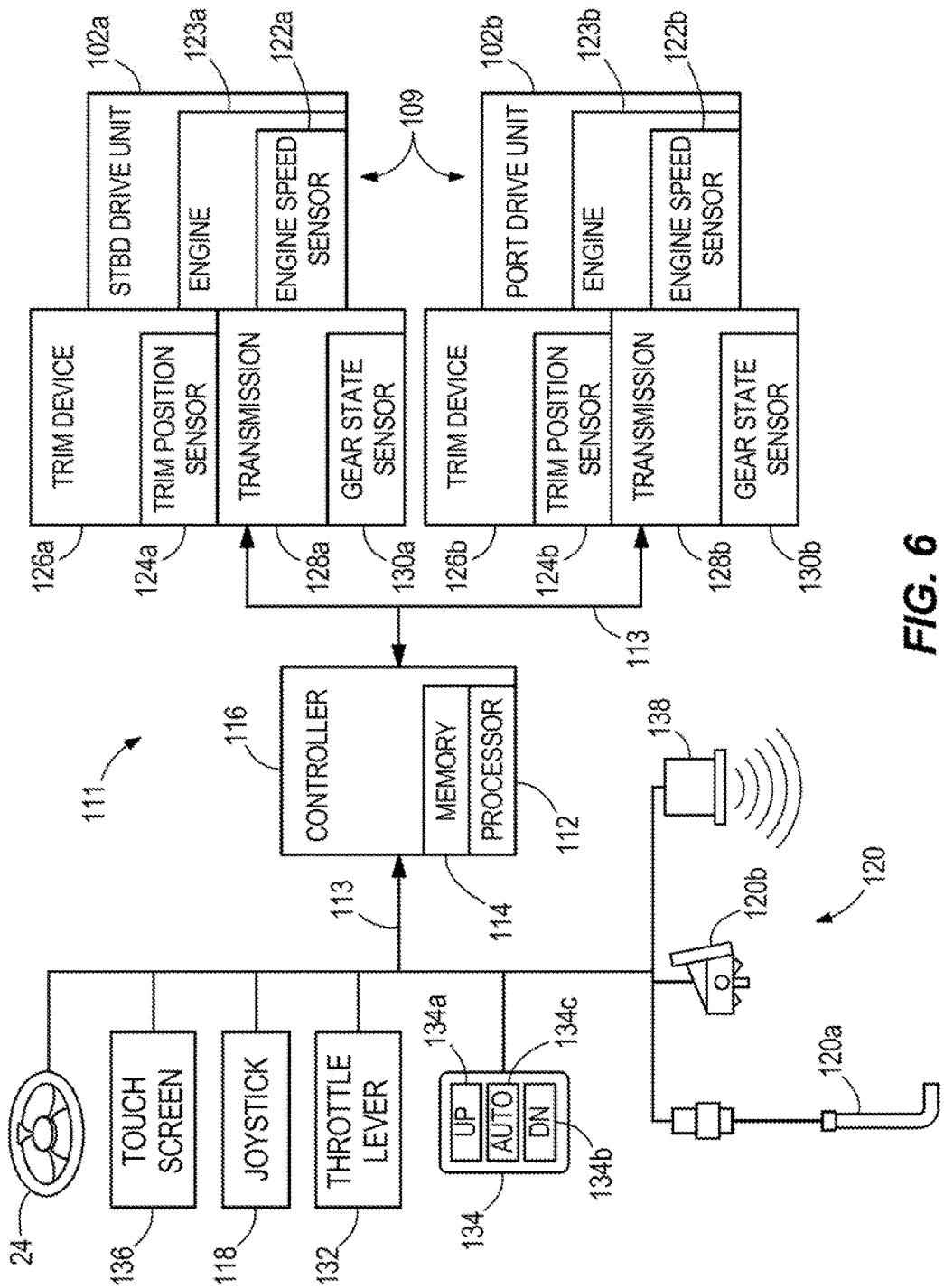
FIG. 6 illustrates one example of a system for controlling actuation of a trim device.

FIG. 6 shows an example schematic of a trim system 111 that comprises part of the system of FIGS. 1-2 or of FIGS. 3-5 and carries out the methods described herein. Although the specific devices and connections between the devices in the trim system 111 shown resemble those for a marine vessel equipped with two outboard motors or two stern drives (drive units 102a, 102b), it should be understood that the vessel could have only one drive unit 102, and/or could additionally be equipped with trim tabs (FIG. 1) as well as trimmable drive unit(s) and the same principles described herein would apply. For example, reference to a trim device 126 or trim devices 126a, 126b apply equally to trim devices 16, 18, references to propulsion system 109 apply equally to propulsion system 9, etc. Note that the system and method described below are therefore equally applicable to a system and corresponding method for positioning a pair of trim tabs on a transom of a marine vessel, wherein the trim tabs replace or supplement the drive units 102a, 102b shown in FIG. 6.

In one example, the trim system 111 includes a controller 116 that is programmable and includes a processor 112 and a memory 114. The controller 116 can be located anywhere in the trim system 111 and/or located remote from the trim system 111 and can communicate with various components of the marine vessel via wired and/or wireless links, as will be explained further herein below. Although FIG. 6 shows a single controller 116, the trim system 111 can include more than one controller 116. For example, the trim system 111 can have a controller 116 located at or near a helm of the marine vessel and can also have one or more controllers located at or near the drive units 102a, 102b. Portions of the method can be carried out by a single controller or by several separate controllers. Each controller 116 can have one or more control sections or control units. One having ordinary skill in the art will recognize that the controller 116 can have many different forms and is not limited to the example that is shown and described. For example, here the controller 116 carries out the trim control method for the trim system 111 as well as controls operation of the propulsion system 109, but in other examples separate trim control units and propulsion control units could be provided.

In some examples, the controller 116 may include a computing system that includes a processing system, storage system, software, and input/output (I/O) interfaces for communicating with devices such as those shown in FIG. 6, and about to be described herein. The processing system loads and executes software from the storage system, such as software programmed with a trim control method. When executed by the computing system, trim control software directs the processing system to operate as described herein below in further detail to execute the trim control method. The computing system may include one or many application modules and one or more processors, which may be communicatively connected. The processing system can comprise a microprocessor (e.g., processor 112) and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system (e.g., memory 114) can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In this example, the controller 116 communicates with one or more components of the trim system 111 and the propulsion system 109 via a communication link 113, which can be a wired or wireless link. The controller 116 is capable of monitoring and controlling one or more operational characteristics of the trim system 111 and the propulsion system 109 and their various subsystems by sending and receiving control signals via the communication link 113. In one example, the communication link 113 is a controller area network (CAN) bus, but other types of links could be used. It should be noted that the extent of connections of the communication link 113 shown herein is for schematic purposes only, and the communication link 113 in fact provides communication between the controller 116 and each of the sensors, devices, and various subsystems described herein, although not every connection is shown in the drawing for purposes of clarity.

As mentioned, the controller 116 receives inputs from several different sensors and/or input devices aboard or coupled to the marine vessel. For example, the controller 116 receives a steering input from a joystick 118 and/or a steering wheel 24. The controller 116 is provided with an input from a vessel speed sensor 120. The vessel speed sensor 120 may be, for example, a pitot tube sensor 120a, a paddle wheel type sensor 120b, or any other speed sensor appropriate for sensing the actual speed of the marine vessel. The vessel speed may instead be obtained by taking readings from a GPS device (see 40, FIG. 1), which calculates speed by determining how far the vessel has traveled in a given amount of time. The drive units 102a, 102b are provided with engine speed sensors 122a, 122b, such as but not limited to tachometers that determine a speed of the engines 123a, 123b powering the drive units 102a, 102b in rotations per minute (RPM). Trim position sensors 124a, 124b are also provided for sensing an actual position of trim devices 126a, 126b, for example, by measuring a relative position between two parts associated with each trim device 126a, 126b. The trim position sensors 124a, 124b may be any type of sensors known to those having ordinary skill in the art, for example Hall effect sensors or potentiometers. Transmissions 128a, 128b and gear state sensors 130a, 130b (sensing forward, neutral, or reverse gear of the transmissions) can also be provided for each drive unit 102a, 102b. The gear state sensors 130a, 130b may be potentiometers and electronic converters, such as analog to digital converters that output discrete analog to digital counts that each represent a position of shift linkages associated with the transmissions, or may be a potentiometer sensing a position of a throttle lever 132 as signifying a gear state of the transmissions.

Other inputs can come from operator input devices such as the throttle lever 132, a keypad 134, and a touchscreen 136. The throttle lever 132 allows the operator of the marine vessel to choose to operate the vessel in neutral, forward, or reverse, as is known. The keypad 134 can be used to initiate or exit any number of control or operation modes (such as auto-trim mode) as will be described further herein below, or to make selections while operating within one of the selected modes. In one example, the operator input device such as the keypad 134 comprises an interface having at least a "trim up" input 134a, a "trim down" input 134b, and an "auto-trim on/resume" input 134c, shown herein as buttons. (In some systems, these input choices are labeled "bow down" and "bow up" and command movement of the trim tabs or drive units that results in such attitude adjustment.) The controller 116 operates the trim system 111 in the manual mode in response to selection of one of the "trim up" input 134a and "trim down" input 134b. For example, a trim up command will actuate the trim device to trim the trim tab or drive unit up, while a trim down command will actuate the trim device to trim the trim tab or drive unit down. On the other hand, the controller 116 may operate the trim system 111 in the automatic mode in response to selection of the "auto-trim on/resume" input 134c.

In another example, the trim up and trim down buttons are provided on the handle of the throttle lever 132, and the auto-trim on/resume button is on the handle as well or placed elsewhere at the helm. The touchscreen 136 can also be used to initiate or exit any number of control or operation modes (such as trim up, trim down, or auto-trim mode), and in that case the inputs can be buttons in the traditional sense or selectable screen icons. The touchscreen 136 can also display information about the trim system 111 and/or the propulsion system 109 to the operator of the vessel, such as engine speed, vessel speed, trim angle, trim operating mode, propulsion system operating mode, etc. A water depth sensor 138 such as a sonar is also provided, one purpose of which will be described later.

Figure 7:
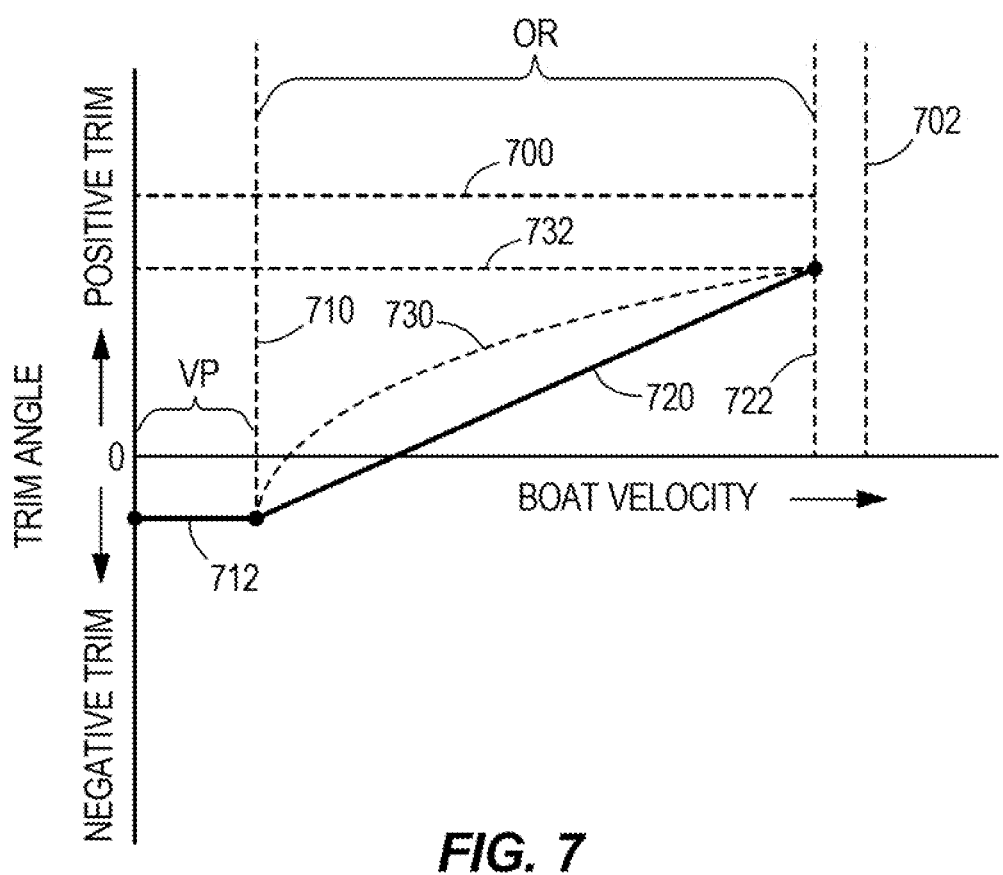
FIG. 7 is a graph illustrating one example of a relationship between an automatically set trim angle and vessel speed.

As mentioned, the controller 116 selectively controls the trim system 111 in an automatic mode, in which the controller 116 sends signals to actuate the trim device 126 automatically. The trim device 126 can be automatically actuated as a function of a speed of the vessel 100 or as a function of a speed of the engine(s) 123a, 123b powering the propulsion system, according to the auto-trim algorithm provided in the software. For example, FIG. 7 is a graphical representation showing an exemplary relationship between the trim angle of a drive unit 102 and the velocity of a marine vessel 100 according to one example of an auto-trim method. An algorithm that accepts engine speed as an input might be exemplified by a similar relationship, although such a relationship will not be shown herein in graphical form. In FIG. 7, line 700 represents a maximum positive trim angle PT of the drive unit 102 that will maintain the drive unit 102 in the water at a functional position. Dashed line 702 represents the maximum velocity of the marine vessel 100. Dashed line 710 represents the planing speed of the marine vessel 100. Line 712 represents the change in velocity of the marine vessel 100 from a stationary condition to the achievement of planing speed at dashed line 710. This increase in velocity is identified as VP in FIG. 7. In one example, the trim angle of the drive unit 102 is maintained at a negative magnitude of NT such as shown in FIG. 4. This negative trim angle is maintained until the marine vessel 100 reaches planing speed 710. Then, the trim angle is increased as a function of vessel speed as indicated by line 720 in FIG. 7. This continues until the marine vessel 100 achieves a velocity which is represented by dashed line 722. It can be seen that this velocity represented by dashed line 722 is less than the maximum velocity 702 of the marine vessel; however, in other examples, it could instead be at the maximum velocity 702. The range of speeds between dashed lines 710 and 722 is identified as its operating range OR between first and second speed magnitudes during which the trim angle is changed, according to this example, as a function of the vessel speed. In FIG. 7, this rate of change is linear as represented by line 720. However, as represented by dashed line 730, this relationship need not be linear in all applications. Dashed line 732 represents the maximum trim that is achieved during automatic trim operation when the marine vessel achieves the second speed magnitude 722. In one example, this maximum trim is trim angle PT shown in FIG. 5. In other examples, the maximum trim achieved during automatic trimming is that represented by dashed line 700. It should be understood that the relationships shown in FIG. 7 are merely exemplary, and that auto-trim systems can be programmed to operate according to various different relationships between vessel speed (or engine speed) and trim angle.

With continued reference to FIG. 7, it should be understood that the relationship between trim angle and vessel speed, between the first and second speed magnitudes 710 and 722, could be accomplished in discreet steps. Although the overall relationship may be linear as represented by line 720 between dashed lines 710 and 722, the overall linearity may be accomplished by changing the trim angle in a finite number of steps. In other words, the change in trim angle from the velocity represented by dashed line 720 to the trim angle 732 at the velocity represented by dashed line 722 may comprise, for example, twenty velocity ranges which are each associated with a particular trim angle. As the speed of the vessel increases, the trim angle would then be changed in discreet increments. The advantage of this particular approach is to reduce the cycle time of the hydraulic pump and other components used to physically move the drive unit to achieve the desired trim angles associated with the particular instantaneous speed of the vessel.

It should be noted that the graph shown in FIG. 7 is meant to show position of a drive unit 102 such as an outboard motor or a stern drive according to the positive and negative trim angle conventions described herein with respect to FIGS. 3-5. If different conventions were used, the graph would not be the same. It should also be understood that if the devices whose positions were being graphed were trim tabs (FIGS. 1 and 2), the trim tabs 12, 14 would be gradually lowered from the level position I to the fully deployed position H during launch (i.e. angle A would be increasing), and then raised back up toward the level position I once the vessel was on plane (i.e. angle A would be decreasing). For further description, see U.S. Pat. No. 5,263,432, incorporated by reference herein above. In either instance, however, the general principle is that a drive unit and/or trim tab can be deployed to different positions depending on boat speed or engine speed in order to affect fuel efficiency, handling, ride quality, and launch time of a vessel.

Prior art auto-trim systems typically require the propulsion system 109 to be idling in order to activate or resume automatic control over trim after the trim system 111 has been disabled due to user override or other conditions. In one example of the present disclosure, a solution is proposed that uses a multi-zone control strategy allowing for unique and intuitive override and resume functionality of auto-trim depending, on vessel speed and engine speed, among other factors.

According to the present method, several operating zones are defined in order to determine how much and when to actuate a trim device that controls position of a drive unit or a trim tab. The chart in FIG. 8 defines different operating zones where trim position is important to ride quality and handling of a marine vessel. These operating zones are defined by engine speed (along the X-axis), vessel speed (along the Y-axis), or both. The zones also define when auto-trim will be active, inactive, or resumed either automatically or in response to operator input. Although any number of operating zones could be established, the example shown herein defines four operating zones (800, 804, 808, 812) separated by at least three different threshold operating speeds. Each operating speed threshold comprises a vessel speed threshold, an engine speed threshold, or a combination of both vessel and engine speed thresholds, as will be described below.

For example, the first operating zone shown at 800 is a near-idle operating zone that ranges from a first operating speed threshold 801 to a second operating speed threshold 802. In one example, both operating speed thresholds 801, 802 comprise engine speed thresholds, and the first engine speed threshold 801 is an engine idle speed and the second engine speed threshold 802 is a calibrated engine speed, and may be, for example, 1000 RPM. This calibrated engine speed may be one at which the bow of the vessel just begins to plow into the water. The second operating, zone is labeled 804, and is a normal operating zone that ranges from the second operating speed threshold 802 to a third operating speed threshold 806. In one example, the third operating speed threshold is also an engine speed, and the third engine speed threshold 806 is a given percentage of a maximum rated engine speed. Here for example, the fraction is 0.8 (or 80% max engine speed). The normal operating zone 804 may include speeds at which plowing occurs, transition speeds between plowing and when the vessel is on-plane, and speeds at which the vessel is on-plane. The third operating zone, shown at 808, is a near wide-open-throttle (WOT) operating zone that ranges from the third operating speed threshold 806 to a fourth operating speed threshold 810, which may also be an engine speed threshold. In one example, the fourth engine speed threshold 810 is the maximum rated engine speed.

The fourth operating zone, shown at 812, is an overspeed operating zone that ranges from a fifth operating speed threshold 814 to a sixth operating speed threshold 815. The fifth operating, speed threshold 814 and the sixth operating speed threshold 815 are shown here as vessel speed thresholds, rather than being defined (at least partly) by engine speed thresholds. In one example, the first vessel speed threshold 814 is a calibrated maximum control speed of the vessel, and the second vessel speed threshold 815 is a maximum achievable vessel speed. The calibrated maximum control speed is a value above which an OEM or installer believes handling of the marine vessel is significantly affected by trimming of the trimmable marine apparatuses (e.g. trim tabs and/or drive units). The maximum vessel speed threshold is an unknown value and varies depending on conditions such as loading, water conditions, wind, etc.

In one example, the boundary between the near-idle operating zone 800 and the normal operating zone 804 is defined by more than merely the second engine speed threshold 802. For example, the boundary may further be defined by a third vessel speed threshold 803, such that both the second engine speed threshold 802 and the third vessel speed threshold 803 must be exceeded in order to transition from the near-idle operating zone 800 to the normal operating zone 804. If either operating speed condition is not met, the system will remain in the current operating zone. Thus, the idle operating zone 800 shown in FIG. 8 may have an irregular shape as shown by the thick diagonal hatch. Because a given engine speed may not necessarily result in the same vessel speed due to vessel loading and/or external conditions, defining the boundary between the two operating zones 800 and 804 by both a vessel speed and an engine speed can help ensure that the vessel is moving fast enough that it truly is about to plow and subsequently transition to be on-plane. For example, the third vessel speed threshold 803 may be 7 KPH. In yet another example, only a vessel speed threshold is used to determine when to switch from the near-idle operating zone 800 to the normal operating zone 804 and vice versa. In still further examples, the boundary between the normal operating zone 804 and the near-WOT operating zone 808 can also be defined by both an engine speed threshold and a vessel speed threshold, or by just a vessel speed threshold.

Different vessels will exhibit different behavior within each of these four operating zones, as shown by comparison of the engine speed to vessel speed profile for a pontoon boat versus the engine speed to vessel speed profile for a bass boat on either side of the shaded area. Also note that when both engine speed and vessel speed dictate transitions between the idle operating zone 800 and the normal operating zone 804, the exemplary bass boat will enter the normal operating zone 804 based on engine speed (see line 802), while the exemplary pontoon is likely to enter the normal operating zone 804 based on boat speed (see line 803) instead. That is, the pontoon might have an engine speed that is above the engine speed threshold 802, but in order to change zones, the pontoon's engine speed must first result in a vessel speed that exceeds the required threshold 803 as well. Thus the small diagonally-hatched area wider line 803, but to the right of line 802, is still, part of the idle operating zone 800 in the case where both an engine speed threshold and a vessel speed threshold must be crossed in order to transition between the idle operating zone 800 and the normal operating zone 804. It should also be noted that the zones may be defined differently for each engine type, vessel, type, and/or engine-vessel combination.

Figure 9:
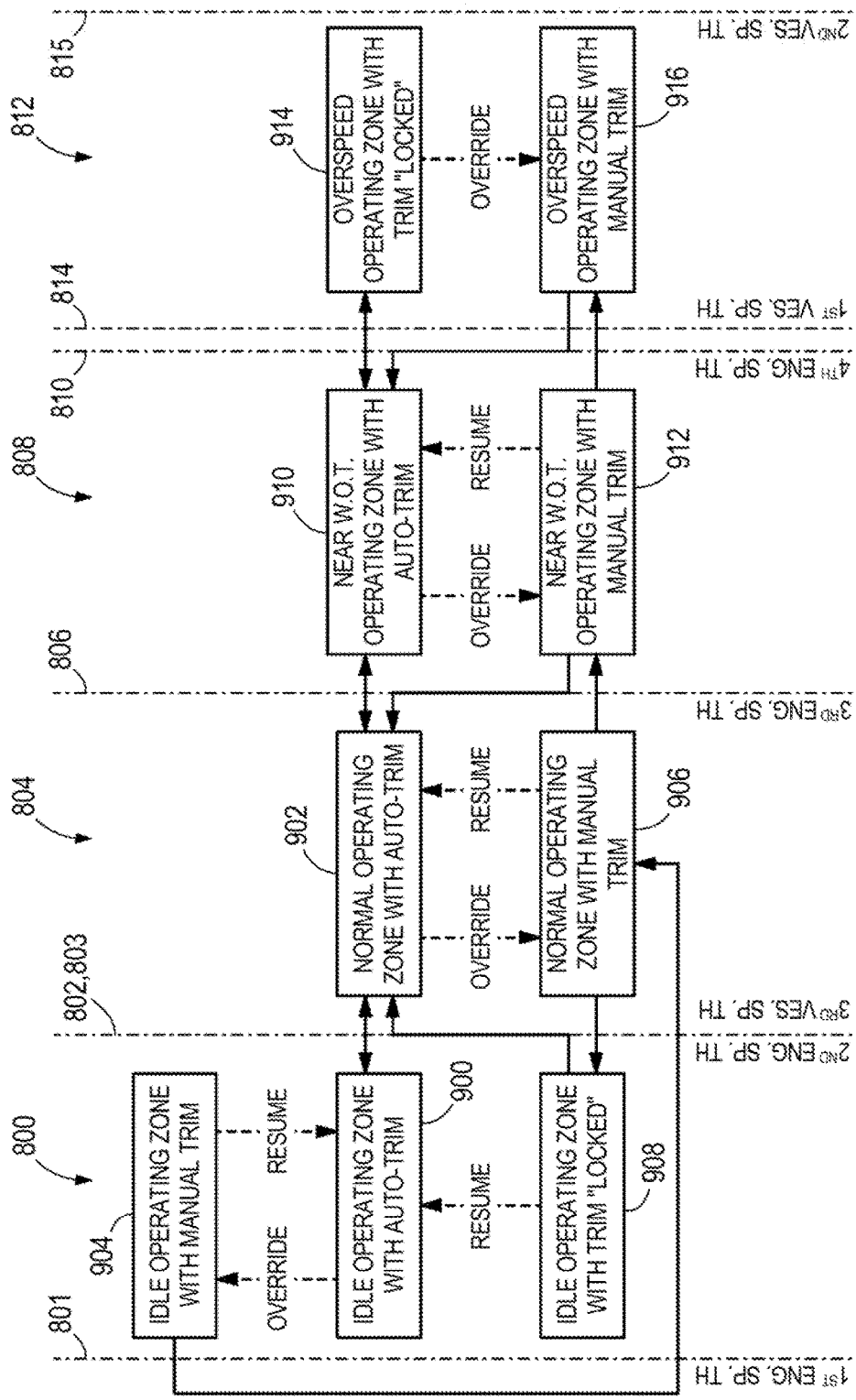
FIG. 9 illustrates further details of the method related to FIG. 8.

Now turning to FIG. 9, details of how a change in operating zone affects whether auto-trim is on, resumed, or overridden (off) will be described. In FIG. 9, delineations between the first engine speed threshold 801, the second engine speed threshold 802, the third engine speed threshold 806, and the fourth engine speed threshold 810 are schematically shown. Delineations between the first vessel speed threshold 814 and the second vessel speed threshold 815 are also schematically shown. The third vessel speed threshold 803 is depicted as sharing a boundary with the second engine speed threshold 802 because in some embodiments both given vessel speed and given engine speed conditions must be met in order to transition from one operating zone to the other. Note that vessel speed and engine speed changes are shown by the solid, arrows in the figure, while operating mode changes are shown by the dashed line arrows.

As mentioned, the input devices (such as the keypad 134 or touchscreen 136) may be used to operate the trim system 111 in one of an automatic mode (auto-trim mode), in which the controller 116 sends signals to actuate the trim device 126 automatically as a function of vessel speed or engine speed, and a manual mode, in which the controller 116 sends signals to actuate the trim device 126 in response to commands from the operator input device. Generally, with an exception noted below, it is assumed that the logic circuit shown in FIG. 9 is entered after an operator has first selected an auto-trim mode via one of the operator input devices described herein above with respect to FIG. 6. The method thereafter includes determining an operating speed of the propulsion system 109. The operating speed may be a speed of the vessel and/or a speed of the engine 123a or 123b powering the propulsion system 109. The vessel speed can be determined using one of the vessel speed sensors 120 or the GPS 40, and the engine speed can be determined, for example, using engine speed sensor 122a or 122b. In response to a determination by the controller 116 that the operating, speed has crossed a given operating speed threshold (e.g., operating speed thresholds 802 and 803 or operating speed threshold 806), the method includes subsequently operating the trim system 111 in one of the automatic and manual modes depending on: (1) whether the operating speed increased or decreased as it crossed the operating, speed threshold; and (2) whether the trim system 111 was operating in the automatic or manual mode as the operating speed crossed the operating speed threshold.

In other examples, the method could include determining with the controller 116 if the operating speed crosses one of two given operating speed thresholds, and if so, subsequently operating the trim system 111 in one of the automatic and manual modes depending on: (1) whether the operating speed increased or decreased as it crossed the one of the two operating speed thresholds; (2) whether the trim system was operating in the automatic or manual mode as the operating speed crossed the one of the two operating speed thresholds; and (3) which one of the two operating speed thresholds the operating speed crossed. The two operating speed thresholds could be the engine idle speed 801 and calibrated engine speed 802, the engine idle speed 801 and the given percentage of a maximum rated engine speed 806, the calibrated engine speed 802 and the given percentage of a maximum rated engine speed 806, or any combination of these. Alternatively, two calibrated engine speeds could be used to define the two thresholds. As mentioned above, any of the operating speed thresholds could be defined by vessel speeds in addition to engine speeds. Although four operating zones (800, 804, 808, 812) are defined based on at least two engine speed thresholds (802 and 806) and at least two vessel speed thresholds (803, 814) with reference to FIGS. 8 and 9, more than four zones could be defined if additional engine and/or vessel speed thresholds are provided, for example between the thresholds at 802/803 and 806. The number of thresholds and whether they are engine speed or vessel speed thresholds or a combination of both is therefore not limiting on the scope of the present disclosure.

Several pathways in FIG. 9 will now be described to show how increasing or decreasing vessel speed or engine speed, the mode in which the trim system 111 is operating when the operating speed threshold is crossed, and which threshold is crossed affect whether the trim system 111 will subsequently be operated in the manual or automatic mode. Beginning in the idle operating zone 800 while in the auto-trim mode as shown at 900, the trim device 126 is actively controlled to a particular trim angle that is optimal for operating at idle. This may be a level trim position as shown in FIG. 3, or a slightly trimmed under position as shown in FIG. 4. From box 900, the operator of the marine vessel can choose to increase engine speed and increase vessel speed, alter which the system moves to box 902, and is in the normal operating, zone 804 with auto-trim. As shown by the two-way arrow, the operator could thereafter choose to return to the idle operating zone 800 by decreasing the engine speed back below the second engine speed threshold 802 and the vessel speed back below the third vessel speed threshold 803, which in this instance represents a vessel speed at which the vessel transitions from fast idle to plowing. In other words, the controller 116 operates the trim system 111 in the automatic mode in response to a determination that the engine speed decreased as it crossed a lower of the two engine speed thresholds (e.g., the second engine speed threshold 802), that the vessel speed decreased as it crossed the vessel speed threshold 803, and that the trim system 111 was operating in the automatic mode as the engine speed crossed the lower of the two engine speed thresholds and the vessel speed crossed the vessel speed threshold 803. On the other hand, if the operator performs an override while operating at 900, the system will switch to operating in the idle operating zone 800 with manual trim, as shown at 904. The operator may thereafter select the "auto-trim on/resume" input on the operator input device to return to operation according to box 900.

If the system is operating, according to box 902, the operator may choose to override auto-trim by manually trimming the trim device, such as by hitting a "trim up" or "trim down" command on the operator input device. The system would then operate in the normal operating zone 804 with manual trim, as shown at 906. If the operator then inputs the auto-trim on/resume command, the trim system will return to operating in the automatic mode, i.e., the system will be in the normal operating, zone with auto trim at box 902. However, if the operator decreases the engine speed and the vessel speed while the system is operating according to box 906, the system will enter the idle operating zone 800 and the trim position will be "locked" at the position it was in when the idle operating zone 800 was entered. This is shown at 908. In other words, the controller 116 maintains a current trim position of the trim device 126 in response to a determination that the engine speed decreased as it crossed a lower of the two engine speed thresholds (e.g., the second engine speed threshold 802), that the vessel speed decreased as it crossed the third vessel speed threshold 803, and that the trim system ill was operating in the manual mode as the engine speed crossed the lower of the two engine speed thresholds and the vessel speed crossed the vessel speed threshold.

From box 908, the operator may then press the on/resume button in order to return to the idle operating zone with auto-trim as shown at 900. Alternatively, if the operator chooses to increase the engine speed and vessel speed while operating at box 908, the system may return directly to the normal operating zone with auto-trim engaged at 902. Thus, when the propulsion system 109 is operating in the normal operating zone 804, the trim system 111 may be operated in the automatic mode in response to the engine speed decreasing below the second engine speed threshold 802 and subsequently increasing above the second engine speed threshold 802 and the vessel speed decreasing below the third vessel speed threshold 803 and subsequently increasing above the third vessel speed threshold 803. This is one way for auto-trim functionality to be automatically re-engaged without requiring an on/resume input from the operator. One exception to this auto-resume function, which applies when the trim angle is above a given angle, will be described further herein below.

When the propulsion system 109 is in the normal operating zone 804 with the trim system 111 in auto-trim as shown at 902, the operator may increase the engine speed and enter the near-wide-open-throttle (WOT) operating zone 808 with auto-trim as shown at 910. From box 910, the operator may override auto-trim by pressing the trim up or trim down selection and may enter a near-WOT operating zone with manual trim, as shown at 912. From box 912, the operator may thereafter select the auto-trim on/resume option to return to operating the trim system in the automatic mode according to box 910. On the other hand, if the operator decreases the engine speed while operating according to box 912, the trim system will return to operating in the automatic mode according to box 902, i.e., the system will operate in the normal operating zone 804 with auto-trim automatically reengaged. This presents one difference from prior art systems/methods, in which after overriding auto-trim, the operator must decrease his engine speed back to idle speed or select on/resume in order to re-engage auto-trim functionality.

If while operating according to box 910, the operator increases the vessel speed beyond first vessel speed threshold 814, he will be in the overspeed operating zone 812 and will transition to operating at box 914. Here, the position of the trim device 126 will be "locked" at the position it was in when the system first entered the overspeed operating zone 812. This is because once vessel speeds exceed the calibrated maximum control speed denoted by the first vessel speed threshold 814, it is assumed that an operator choosing to travel at such high vessel speeds understands exactly what repositioning the trim device 126 will do to change the attitude and handling of the marine vessel. The operator is allowed to override the locked position of the trim device 126 and operate according to box 916, in which the system is in the overspeed operating, zone and the trim device 126 is controlled manually. This assumes that the operator is experienced enough to predict what will happen if he manually trims the trim device 126. In essence, the trim system 111 is restricted to operation solely in the manual mode in response to a determination by the controller 116 that the propulsion system 109 is operating in the overspeed operating zone. If the operator decreases the vessel speed while operating according to box 916, the trim system 111 will return to operating, in the automatic mode according, to box 910, i.e., the system will operate in the near-WOT operating zone 808 with auto-trim automatically reengaged. Again, this presents one difference from prior art systems, in which the operator must decrease his engine speed back to idle speed in order to re-engage auto-trim functionality or press on/resume using keypad 134.

It should be understood that when in any of the manual trim modes, increasing the speed of the marine vessel or the engine will have no effect on the type of trim mode. In other words, if the system begins at 904 (idle operating zone with manual trim), assuming auto-trim functionality has never been turned on or has purposefully been turned off, increasing the engine speed and vessel speed will shift the system to 906. Similarly, the system can be shifted from 906 to 912 by further increasing the engine speed, and from 912 to 916 by further increasing the vessel speed. However, when decreasing vessel speed causes the system to transition from the overspeed operating zone 812 with manual trim or locked trim (916 or 914, respectively) to the near-WOT operating zone 808, or to transition from the near-WOT operating zone 808 with manual trim or auto-trim (912 or 910, respectively) to the normal operating zone 804, the trim device 126 is thereafter operated in the auto-trim mode regardless of the mode in which it was previously operating. For example, see the transitions from box 916 to 910 and from box 914 to 910, as well as the transitions from box 912 to 902 and from box 910 to 902.

In other words, when the vessel speed threshold represents a calibrated maximum control speed 814 of the vessel, the controller 116 operates the trim system 111 in the automatic mode in response to a determination that the vessel speed decreased as it crossed the vessel speed threshold 814, regardless of whether the trim system was operating in the automatic or manual mode as the vessel speed crossed the vessel speed threshold 814. The controller 116 also operates the trim system 111 in the automatic mode in response to a determination that the engine speed decreased as it crossed a higher of the two engine speed thresholds (e.g., the third engine speed threshold 806), regardless of whether the trim system 111 was operating in the automatic or manual mode as the engine speed crossed the higher of the two engine speed thresholds. Both of these methods provide failsafes that cause the trim system 111 to re-enter the auto-trim mode as vessel or engine speed decreases, but still allow an experienced operator to later override auto-trim if he would like to do so by selecting the trim up or trim down options. The method therefore eliminates the requirement that an operator manually reengage auto-trim after it was overridden and/or that an operator decrease his engine speed to idle before re-entering auto-trim mode.

Figure 8:
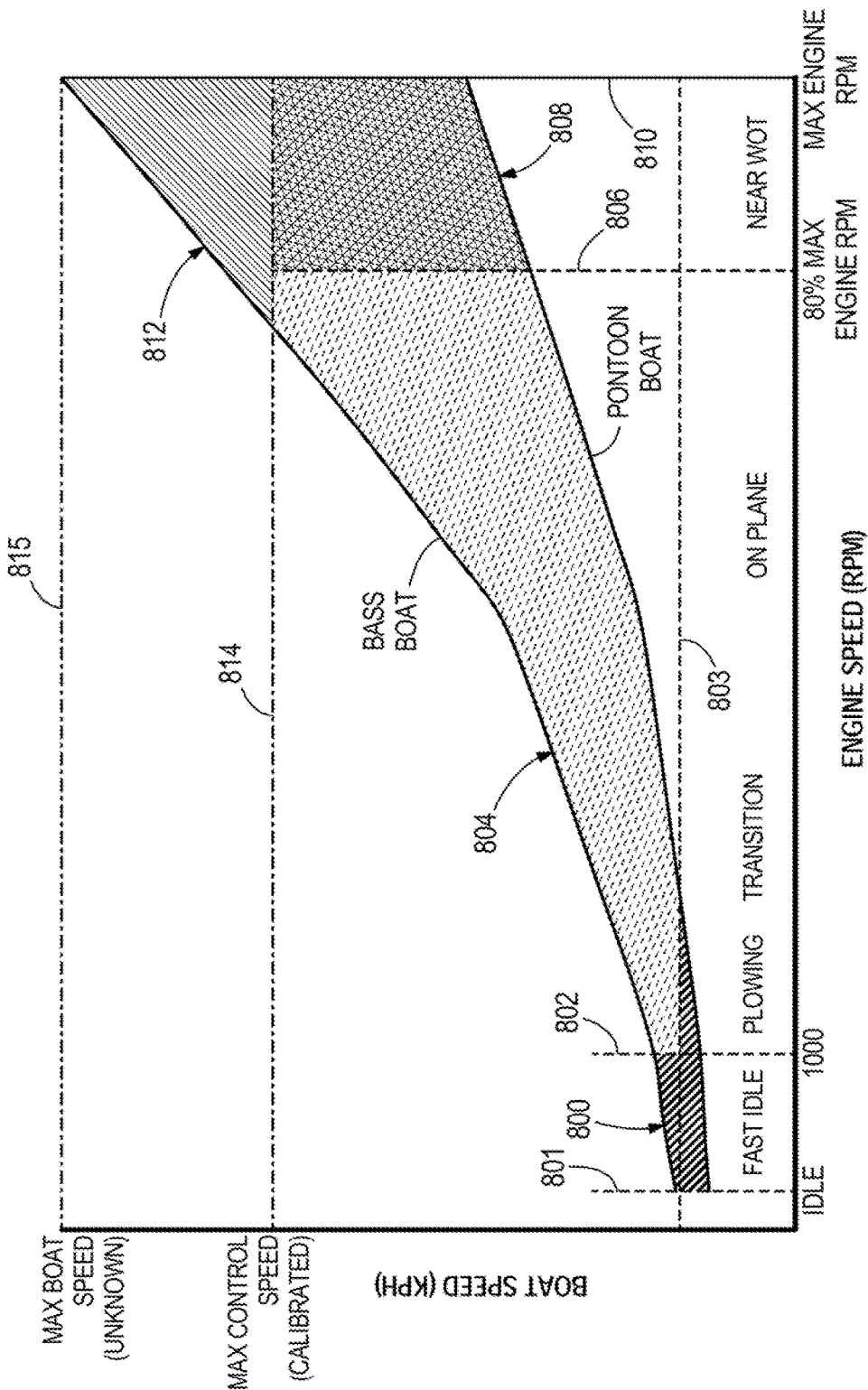
FIG. 8 is a chart illustrating one example of system operating zones according to one method of the present disclosure.

Additionally, the method described with respect to FIGS. 8 and 9 can include determining if the current trim position (measured by trim position sensor 124a or 124b) exceeds a given trim position, and if so, at least temporarily disabling the automatic mode and maintaining the current trim position of the trim device 126a or 126b. This may be done no matter which operating zone the propulsion system 109 is in. This allows the operator to position the trim devices 126a, 126b or 16, 18 such that the drive units 102a, 102b or trim tabs 12, 14 are trimmed up when operating in shallow water, without the fear that decreasing speed will cause the trim devices to be automatically trimmed back down. In other words, the measured extent of actuation of the trim device suggests that such actuation is on purpose and done in order to avoid contact of the drive units 102a, 102b or trim tabs 12, 14 with underwater obstructions. In some examples, the water depth sensor 138 can be used to measure a depth of the water in which the vessel is operating, and the water depth can be used to determine if the reason for the current trim position being so high is in fact due to shallow water. If the water is not in fact shallow, the system may allow operation in the auto-trim mode even if the current trim position exceeds the given trim position.

Each of the above exemplary methods is designed to provide both experienced and inexperienced operators alike with a helpful auto-trim enable/disable routine. An inexperienced operator can rest assured that auto-trim will generally remain engaged when engine speed or vessel speed decreases. An experienced operator can override or resume auto-trim functionality on command. Failsafes at both the upper and lower ends of the engine and vessel operating speed thresholds can be provided to ensure good handling and to prevent inefficient or dangerous trim positions.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method for controlling a trim device that positions a trimmable marine apparatus with respect to a marine vessel having a propulsion system powered by an engine, the method comprising:

operating a trim system in one of an automatic mode, in which a controller sends signals to actuate the trim device automatically as a function of one of a speed of the vessel and a speed of the engine, and a manual mode, in which the controller sends signals to actuate the trim device in response to commands from an operator input device;

determining an operating speed of the propulsion system; and in response to a determination by the controller that the operating speed has crossed a given operating speed threshold, subsequently operating the trim system in one of the automatic and manual modes depending on:
whether the operating speed increased or decreased as it crossed the operating speed threshold; and
whether the trim system was operating in the automatic or manual mode as the operating speed crossed the operating speed threshold.

2. The method of claim 1, wherein the operating speed comprises one of the vessel speed and the engine speed, and wherein the operating speed threshold comprises one of a vessel speed threshold and an engine speed threshold.

3. The method of claim 2, further comprising determining with the controller if the operating speed crosses one of two given operating speed thresholds, and if so, subsequently operating the trim system in one of the automatic and manual modes depending on:
whether the operating speed increased or decreased as it crossed the one of the two operating speed thresholds;
whether the trim system was operating in the automatic or manual mode as the operating speed crossed the one of the two operating speed thresholds; and
which one of the two operating speed thresholds the operating speed crossed.

4. The method of claim 3, further comprising defining at least four operating zones of the propulsion system based on at least two engine speed thresholds and at least two vessel speed thresholds.

5. The method of claim 4, further comprising:
defining a near-idle operating zone that ranges from a first engine speed threshold to a second engine speed threshold;
defining a normal operating zone that ranges from the second engine speed threshold to a third engine speed threshold;
defining a near wide-open-throttle operating zone that ranges from the third engine speed threshold to a fourth engine speed threshold; and
defining an overspeed operating zone that ranges from a first vessel speed threshold to a second vessel speed threshold.

6. The method of claim 5, wherein:
the first engine speed threshold is an engine idle speed;
the second engine speed threshold is a calibrated engine speed;
the third engine speed threshold is a given percentage of a maximum rated engine speed;
the fourth engine speed threshold is the maximum rated engine speed;
the first vessel speed threshold is a calibrated maximum control speed of the vessel; and
the second vessel speed threshold is a maximum achievable vessel speed.

7. The method of claim 5, further comprising restricting the trim system to operation solely in the manual mode in response to a determination by the controller that the propulsion system is operating in the overspeed operating zone.

8. The method of claim 5, wherein when the propulsion system is operating in the near wide-open-throttle operating zone, the method further includes one of the following:
operating the trim system in the automatic mode in response to an on/resume command input via the operator input device; and
operating the trim system in the manual mode in response to an override command input via the operator input device.

9. The method of claim 5, further comprising operating the trim system in the automatic mode in response to one of the following:
the propulsion system transitioning from the overspeed operating zone to the near wide-open-throttle operating zone; and
the propulsion system transitioning from the near wide-open-throttle operating zone to the normal operating zone.

10. The method of claim 5, wherein a boundary between the near-idle operating zone and the normal operating zone is further defined by a third vessel speed threshold, such that both the second engine speed threshold and the third vessel speed threshold must be exceeded in order to transition from the near-idle operating zone to the normal operating zone.

11. The method of claim 10, wherein when the propulsion system is operating in the normal operating zone, the method further comprises operating the trim system in the automatic mode in response to one of:
an on/resume command input via the operator input device; and
the engine speed decreasing below the second engine speed threshold and subsequently increasing above the second engine speed threshold and the vessel speed decreasing below the third vessel speed threshold and subsequently increasing above the third vessel speed threshold.

12. The method of claim 1, further comprising determining with the controller if a current trim position of the trim device exceeds a given trim position, and if so, at least temporarily disabling the automatic mode and maintaining the current trim position of the trim device.

13. A trim system for positioning a trimmable marine apparatus with respect to a marine vessel having a propulsion system powered by an engine, the trim system comprising:
a trim device having a first end coupled to the vessel and a second, opposite end coupled to the trimmable marine apparatus, the trim device being moveable to adjust a position of the trimmable marine apparatus with respect to the vessel;
a controller selectively controlling the trim system in an automatic mode, in which the controller sends signals to actuate the trim device automatically as a function of one of a speed of the vessel and a speed of the engine;
an operator input device selectively controlling the trim system in a manual mode, in which the controller sends signals to actuate the trim device in response to commands from the operator input device; and
an operating speed sensor sensing an operating speed of the propulsion system;
wherein, in response to a determination by the controller that the operating speed has crossed a given operating speed threshold, the controller subsequently operates the trim system in one of the automatic and manual modes depending on:
whether the operating speed increased or decreased as it crossed the operating speed threshold; and
whether the trim system was operating in the automatic or manual mode as the operating speed crossed the operating speed threshold.

14. The trim system of claim 13, wherein the operating speed comprises one of the vessel speed and the engine speed, and wherein the operating speed threshold comprises one of a vessel speed threshold and an engine speed threshold.

15. The trim system of claim 14, wherein the controller further determines if the operating speed crosses one of two given operating speed thresholds, and if so, subsequently operates the trim system in one of the automatic and manual modes depending on:
whether the operating speed increased or decreased as it crossed the one of the two operating speed thresholds;
whether the trim system was operating in the automatic or manual mode as the operating speed crossed the one of the two operating speed thresholds; and which one of the two operating speed thresholds the operating speed crossed.

16. The trim system of claim 15, wherein the one of the two operating speed thresholds is a vessel speed threshold representing a calibrated maximum control speed of the vessel, and wherein the controller operates the trim system in the automatic mode in response to a determination that the vessel speed decreased as it crossed the vessel speed threshold, regardless of whether the trim system was operating in the automatic or manual mode as the vessel speed crossed the vessel speed threshold.

17. The trim system of claim 15, wherein the two operating speed thresholds comprise two given engine speed thresholds, and wherein the controller operates the trim system in the automatic mode in response to a determination that the engine speed decreased as it crossed a higher of the two engine speed thresholds, regardless of whether the trim system was operating in the automatic or manual mode as the engine speed crossed the higher of the two engine speed thresholds.

18. The trim system of claim 17, further comprising a third operating speed threshold comprising a vessel speed threshold representing a vessel speed at which the vessel transitions from idling to plowing;
wherein the controller operates the trim system in the automatic mode in response to a determination that the engine speed decreased as it crossed a lower of the two engine speed thresholds, that the vessel speed decreased as it crossed the vessel speed threshold, and that the trim system was operating in the automatic mode as the engine speed crossed the lower of the two engine speed thresholds and the vessel speed crossed the vessel speed threshold; and
wherein the controller maintains a current trim position of the trim device in response to a determination that the engine speed decreased as it crossed a lower of the two engine speed thresholds, that the vessel speed decreased as it crossed the vessel speed threshold, and that the trim system was operating in the manual mode as the engine speed crossed the lower of the two engine speed thresholds and the vessel speed crossed the vessel speed threshold.

19. The trim system of claim 13, wherein the operator input device comprises an interface having at least a first input for commanding the trimmable marine apparatus to trim up, a second input for commanding the trimmable marine apparatus to trim down, and a third input for commanding the automatic mode to one of turn on and resume;
wherein the controller operates the trim system in the manual mode in response to selection of one of the first and second inputs; and
wherein the controller operates the trim system in the automatic mode in response to selection of the third input.

20. The trim system of claim 13, further comprising a trim position sensor sensing a current trim position of the trim device;
wherein the controller determines if the current trim position exceeds a given trim position, and if so, at least temporarily disables the automatic mode and maintains the current trim position of the trim device.

* * * * *